Dec. 24, 1940.  R. EHRLICH  2,225,625
SUNGLASSES
Filed Oct. 9, 1939
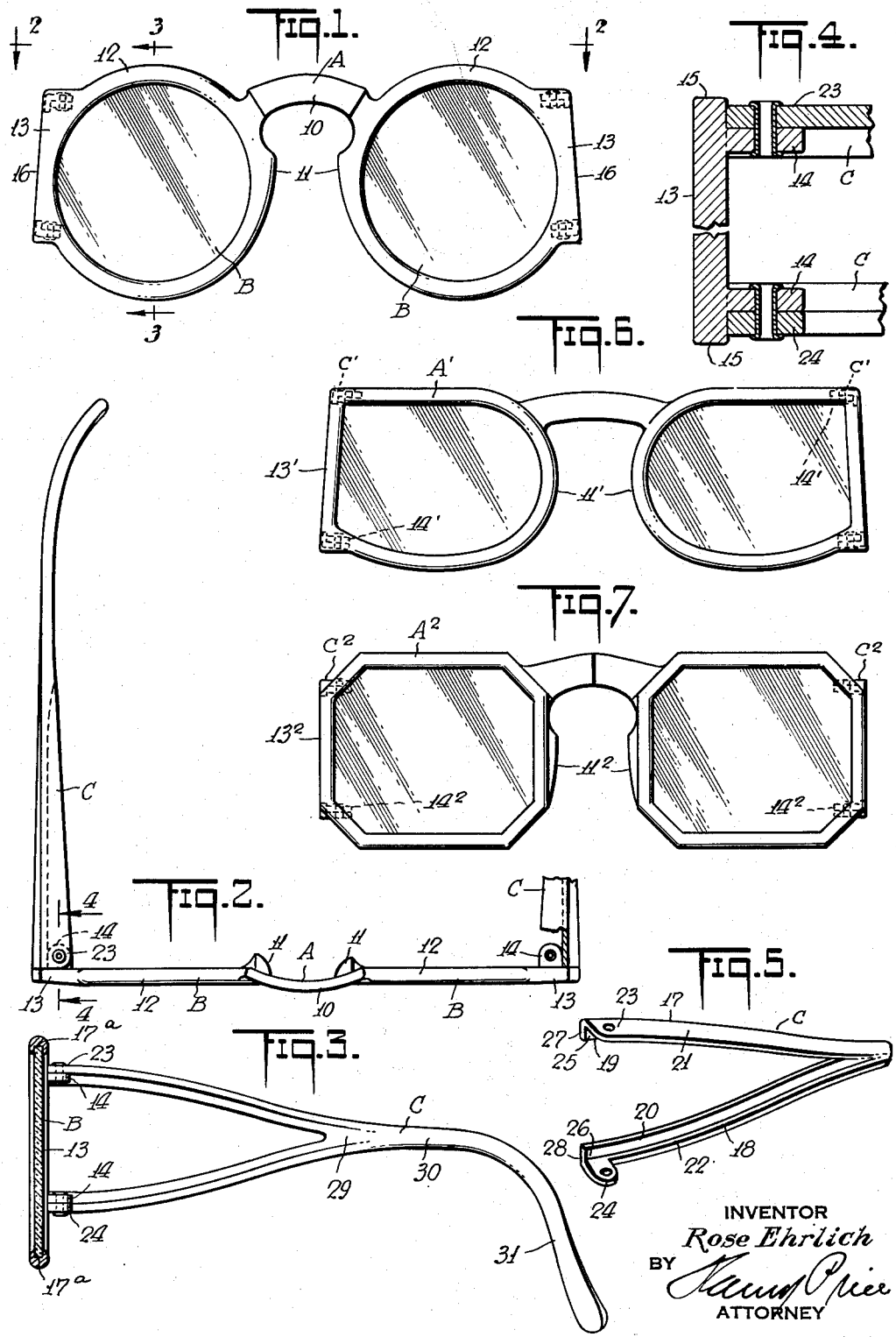
INVENTOR
Rose Ehrlich
BY
ATTORNEY Patented Dec. 24, 1940

2,225,625

UNITED STATES PATENT OFFICE 2,225,625

SUNGLASSES

Rose Ehrlich, New York, N. Y.

Application October 9, 1939, Serial No. 298,555

1 Claim. (Cl. 88—41)

The present invention relates to sunglasses and it particularly relates to sunglasses, the frames of which are made of molded plastic materials.

Although the present invention has many features which are applicable to other constructions of sunglasses, it is to be understood that it has its most particular application to those sunglasses, the rims and temple portions of which are formed of plastic materials.

It is among the objects of the present invention to provide an improved sunglass construction in which the frames and temple portions are formed of molded material of relatively thin stock and light weight, and which, at the same time, will be strong, may be readily fitted to the face of the wearer and may be readily handled and flexed without danger of breakage.

Another object is to provide sunglasses of the character described above, which may be readily incorporated with lens structures of various shapes and forms and at the same time will be strong and durable and may be readily flexed without breakage, even though made of very thin molded stock, which stock may be substantially devoid of internal reinforcement.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects it has been found most satisfactory to form both the lens carrying structures as well as the temple structures of very thin molded structure of cellulose acetate or other cellulose ester or ether or synthetic resinous materials.

It has been found that the structure may be made particularly thin and subject to flexure without breaking and at the same time most adaptable to be fitted upon the face of the wearer when there are provided at least four hinge structures at substantially vertically spaced points at the both ends of lens carrying structure, as well as at the top and bottom of the temple structure.

At the same time it has been found that the temple structure may be most satisfactorily formed of a wishbone construction, terminating in single downturned extensions to fit against and in back of the ears of the wearer. The wishbone is most desirably formed of angle members or bars of L-shaped cross section, which converge together to form the ear or head contact portions.

Desirably the horizontal portions of said L-shaped bars carry the pivot pins, which, at the same time, may extend through lugs extending integrally rearwardly from the upper and lower side edges of the front eye shielding portions.

Desirably these lugs may abut the wishbone structure and limit the movement of said wishbones outwardly, and/or if desired, such abutment may also be aided by an abutment between the forward ends of the wishbones and the side edges of the eye shielding portions.

In the drawing, which illustrates one of the preferred embodiments of the present invention, but to which the invention is by no means restricted, since many changes and alterations might be made, all within the scope of the invention of the present specification:

Fig. 1 is a front elevational view of one form of eye shielding portion according to the present invention, Fig. 2 is a top plan view from the line 2—2 of Fig. 1 with most of one of the temple portions removed and the remainder shown partly in section, Fig. 3 is a transverse side sectional view upon the line 3—3 of Fig. 1, showing a section through one of the eye shielding elements and showing the inside face of the temple portion in elevation, Fig. 4 is a transverse sectional view upon the line 4—4 of Fig. 2, upon an enlarged scale as compared to Fig. 2, showing the pivot connections, Fig. 5 is a top perspective view of the forward portion of the wishbone structure of the forward end of the temple element, and Figs. 6 and 7 show alternative forms of the front of the eye shielding portion.

Referring to the drawing, the main eye shielding frame A carries the lenses B, which may be of the Crookes type, and which also, if desired, may be ground and polished.

This frame has the bridge 10, the nose pads 11, the rims 12 and the side vertical extensions 13, which extensions may be provided with the integrally molded lugs 14 positioned substantially inside the upper and lower horizontal edges 15 thereof and also inside of the side edges 16 thereof.

This entire frame structure A may be molded or even partly extruded in one piece of relatively thin sheet structure, and if desired, even the grooves 17a for holding the lenses B may be molded at the same time.

The temple structures C, as best shown in Figs. 2, 3, 4 and 5, are provided with the wishbone structure formed by the forwardly diverging upper and lower right angular members 17 and 18 having the vertical flanges 19 and 20 and the horizontal flanges 21 and 22 and the hinge portions 23 and 24, which may constitute continuations of or enlargements upon the horizontal flanges 21 and 22, or horizontal projections or enlargements if said flanges are omitted. Although not preferred, either the vertical flanges 19 and 20 or the horizontal flanges 21 and 22 might be omitted to give flat strips forming the legs of the wishbone structure.

The members 17 and 18, as noted, are L-shaped in cross section, and, if desired, the inside faces 25 and 26 might be limited by abutment against the outside edges of the lugs, flanges or extensions 14.

If desired, there may also or instead be provided an abutment between the edges 27 and 28 and the side portions 13—13 of the frame, as, for example, is indicated in Fig. 2.

The two bar members 17 and 18 converge together and merge at 29 to form the rounded temple portions 30, which extend rearwardly at 31 to fit behind the ear of the wearer.

By the construction, as shown, it is possible to obtain very firm, rigid sunglasses of molded structure, although it may be molded relatively thin, which may be flexed readily without breakage.

In Figs. 6 and 7 are shown alternative forms of rim structures (correspondingly functioning parts being indicated by the same letters and numerals primed or provided with a superior 2, respectively).

If desired, the horizontal flange portions 21 and 22 may be positioned inside of the lugs 14 instead of outside of the lugs, as shown in Fig. 4, in which case the only abutment which will be obtained will be at the edges 27 and 28.

The space between the bars or legs of the wishbone C may be covered by colored glass or molded sheet plastic material (molded integrally with the structure C if desired), but this is not preferred. The lens B and frame 12 may also be replaced by a thin molded transparent plastic sheet of material forming an integral part of the frame A. The lugs 14 instead of being integrally molded with the frame A, may consist of a U-member of metal or plastic riveted or adhesively attached.

The present application is a continuation in part of application Serial No. 198,090, filed March 25, 1938, which matured into Patent No. 2,177,610 dated October 24, 1939.

Many other changes could be effected in the particular features of sunglasses designed, and in the methods of operation set forth, and in specific details thereof, without substantially departing from the invention intended to be defined in the claim, the specific description herein merely serving to illustrate certain elements by which, in one embodiment, the spirit of the invention may be effectuated.

What I claim is:

An eye shield comprising a substantially flat front eye-shielding portion having substantially vertical straight ends, lugs projecting backwardly from the upper and lower edges of said front portion, at said substantially straight ends of the same, forwardly diverging upper and lower angle members in spaced relation forming wishbone shaped temple portions, the front ends of which are separated to fit against said lugs at the upper and lower edges of the front portion, the ends of the wishbone structure abutting the vertical straight ends when said temple portions are in open position, and pivot members extending vertically through said lugs and the horizontal portions of the ends of the members of said wishbone structure.

ROSE EHRLICH.